Patented Aug. 12, 1941

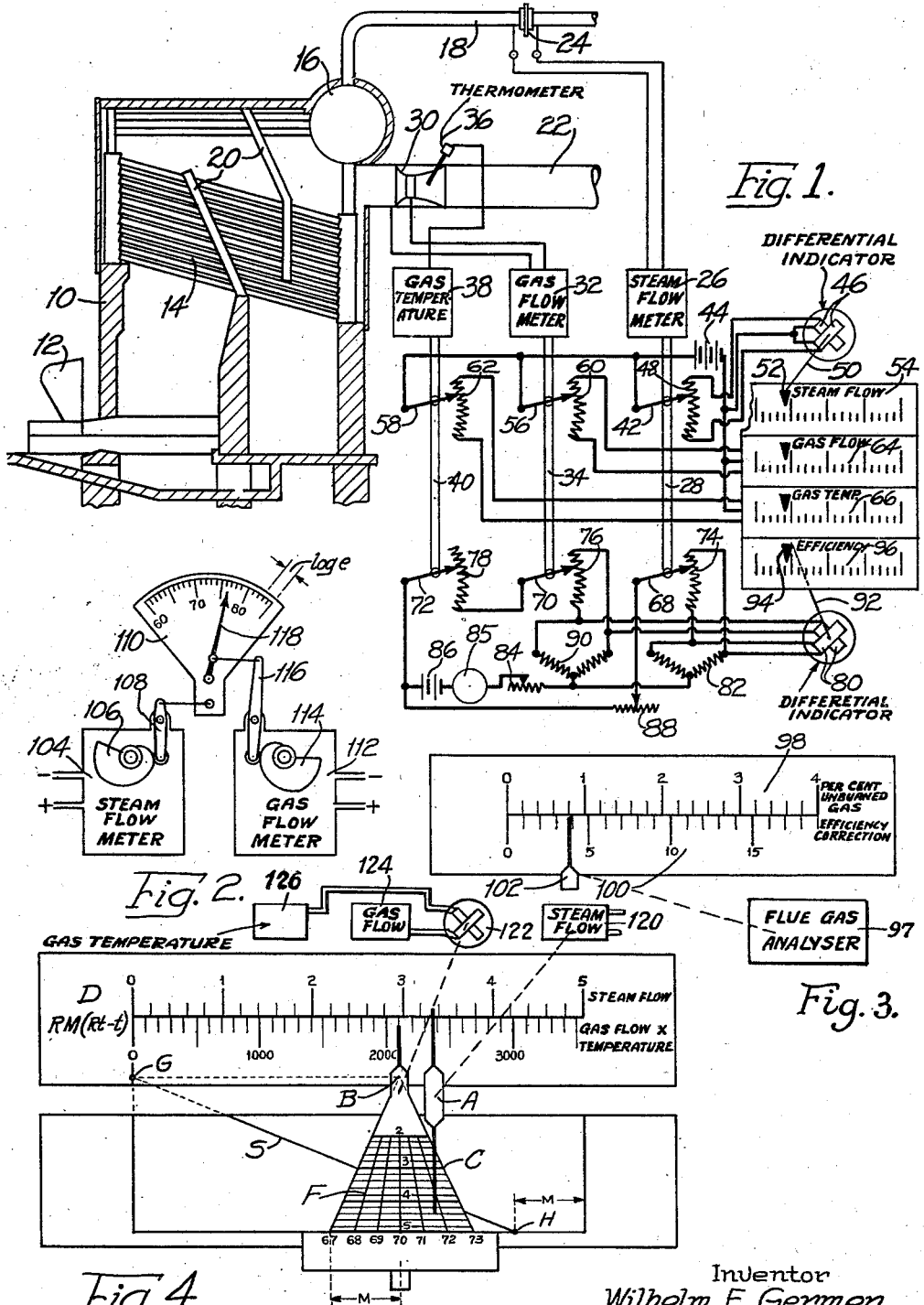

2,252,367

UNITED STATES PATENT OFFICE 2,252,367

EFFICIENCY METER

Wilhelm E. Germer, Berlin-Charlottenburg, Germany

Application August 27, 1938, Serial No. 227,136
In Germany August 21, 1937

9 Claims. (Cl. 73—196)

This invention relates to an efficiency meter and more particularly to an apparatus for the determination of the most favorable operation of boilers and for the determination and continual indication of the rate of efficiency and the flue gas loss of a boiler in percent.

The economic operation and the correct control of a boiler is based at present mainly upon the continual test of the flue gases, taken at a point in the passes of the boiler, where the combustion has just been completed. The percentage of $CO_2$ and of $(CO+H_2)$ or of $O_2$ and $(CO+H_2)$, indicated continually by a gas analyzer, permits the determination of the amount of excess air, used for the combustion and serves in addition to indicate whether the combustion in the boiler has been complete or incomplete. The stratification of the flue gases in connection with the lag of the gas analyzer makes this determination doubtful and gives the boiler operator no reliable guide to find and maintain the most favorable operation of the boiler.

Attempts have been made to overcome this difficulty by taking the differential draft at two points of the boiler, for instance the draft loss between the second and third pass, as a measure of the amount of flue gas flow and comparing this amount continuously with the generated amount of steam. By various and elaborate boiler tests, one tries to find that relation between flue gas and steam flow, that will provide the best operation of the boiler. Control may be effected by utilizing steam flow and gas flow meters adjusted so that their pointers will coincide at the best operation of the boiler, as shown by the tests, and by adjusting the air flow from time to time to keep the pointers together.

It is hardly possible, however, to determine the most favorable combustion and the best air flow with this method, as such boiler tests have to be carried through over long periods of time at constant load and constant excess air, in order to give somewhat reliable results. It is therefore nearly impossible to determine accurately in such a way the best air flow at various amounts of excess air for different loads. This method of boiler control has the particular disadvantage that a fixed relation is established between steam and air flow. This is not correct, as this relation changes rapidly as soon as the condition of the boiler changes. Deposits of the feed water in the tubes or slagging of the tubes change at once the amount of steam at the same state of combustion, or the same air flow. This leads to an incorrect operation of the boiler, not visible from outside, and to the necessity of the difficult readjustment of the instruments.

It is accordingly one of the objects of the invention to provide an efficiency meter which indicates at all times the true conditions of operation of a boiler.

Another object of the invention is to provide an efficiency meter which provides an accurate indication of the efficiency at all times. According to one feature of the invention the efficiency is indicated instantaneously on a single instrument so that an operator can ascertain the operating conditions at a glance.

Still another object of the invention is to provide an efficiency meter in which the efficiency is determined by comparing the amount of useful heat in the steam with heat losses in the flue gas and by radiation and the like. Preferably the determination is modified to compensate for unburned gas leaving the boiler.

Other objects, advantages and novel features of the invention will appear as the description proceeds.

According to the method of the present invention a complete combustion in the boiler is assumed at first, the real rate of efficiency of the boiler is determined for this condition and indicated continuously in percent on a dial or recording instrument. In addition the total percentage of unburnt gases, such as CO or $H_2$, will be determined from flue gas samples taken in the passes or in the flue gas channel and indicated on an instrument having a scale which permits the direct reading of the correction required for the plus indication of the rate of efficiency as soon as incomplete combustion takes place. The true rate of efficiency will thus always be obtained. The $(CO+H_2)$ indicator will read zero, if a complete combustion exists.

The practical solution of the present method demands the continual determination of the heat energy flowing off with the flue gases and the heat energy used for the generation of the steam. The first energy is found by:

$$E_1 = RM.(Rt-t).cpm$$

Herein $E_1$ signifies the heat energy contained in the flue gas in kcal./sec., $RM$ the amount of the gas flow in m.³/sec. at zero degree centigrade and 760 mm. mercury, $Rt$ the temperature of the gas mixture in degrees centigrade, $t$ the temperature of the air in the boiler room in centigrade, and $cpm$ the mean specific heat for 1 m.³ of the flue gas at zero degrees centigrade and 760 mm. mercury between $Rt$ and zero. This energy $E_1$ is independent of the amount of secondary air contained in the flue gas at the point of flow measurement, as an addition of secondary air increases the quantity of gas and decreases the temperature of the gas mixture, while the product for the heat energy $E_1$ remains constant.

According to the invention the flue gas measurement is accurately taken as a nozzle or orifice measurement in the flue or stack so as to include all secondary air and all air filtering into the boiler and so as to obtain an accurate measure of flow unaffected by changes in the internal condition of the boiler. The temperature measurement is preferably taken at the same point as the flow measurement and the flow measurement is multiplied by the difference in temperature between the flue gas and the air in the boiler room to obtain an accurate measure of the heat energy flowing out in the flue gas.

The energy $E_2$ used for the continuous generation of the steam is obtained by $$E_2 = D \cdot (i - ts)$$

in which $E_2$ signifies the total heat energy used for the generation of the steam in kcal./sec., $D$ the steam flow in kg./sec., $i$ the heat capacity of 1 kg. of steam in kcal. and $ts$ the temperature of the feed water in degrees centigrade.

Since the heat capacity $i$ of saturated steam changes very little with changes in pressure and since the changes in heat capacity of superheated steam are substantially compensated by errors in an ordinary orifice type of steam flow meter which is uncorrected for temperature, I have found that accurate results can be obtained by using a constant mean value of $i$o. Changes in feed water temperature $ts$ are relatively small and infrequent and may easily be taken care of by a correcting adjustment, preferably manual. Therefore, the energy $E_2$ of the steam may be indicated directly for practical purposes by an uncorrected steam flow meter adjusted to compensate for the feed water temperature.

If $E$ signifies the total energy of the fuel in kcal./sec. taking part in the combustion, there still remains a third small part of energy $E_3$, about one half of which is due to losses in conductivity and radiation and the other half to losses of unburnt fuel in the ashes, called the refuse losses. These losses can be considered as nearly constant, as they depend very little on the operation of the boiler and vary only between 4 to 6 percent. These losses can be determined partly by an ash analysis and partly be estimated empirically, according to the type of the boiler.

For complete combustion the following equation for the distribution of the fuel energy in kcal./sec. can be set up:

$$E = E_1 + E_2 + E_3$$

If $\eta$ signifies the rate of efficiency of the boiler in percent, $Va$ the heat loss contained in the flue gases in percent, and $a$ the sum of the constant losses in percent, one can write:

$$100 = Va + \eta + a$$

From these two equations the following relation may be derived:

$$\frac{E_2}{E_1 + E_2} = \frac{\eta}{100 - a}$$

and $$\frac{\eta}{100 - a} = \frac{D(i - ts)}{D \cdot (i - ts) + RM \cdot (Rt - t) \cdot cpm}$$

or finally $$\eta = \frac{100 - a}{1 + \frac{RM \cdot (Rt - t)}{D} \cdot \frac{cpm}{(i - ts)}}$$

As $cpm$ and $(i - ts)$ may be considered as constant, one can substitute a new constant $$\mu = \frac{cpm}{(i - ts)}$$

and can consider the rate of efficiency of the boiler as a function of the quotient $$\mu \cdot \frac{RM \cdot (Rt - t)}{D}$$

Denoting this variable quotient with $x$, one obtains $$x = \frac{RM \cdot (Rt - t)}{D} \cdot \mu$$

$$\eta = \frac{100 - a}{1 + x}$$

Since the percentage of the total heat which is converted into useful heat in the steam is a direct measure of the efficiency of the boiler as represented by $\eta$, the boiler efficiency can be directly measured by a quotient meter measuring the quotient $$x = \frac{RM \cdot (Rt - t)}{D} \cdot \mu$$

The meter may be calibrated according to the function $$\eta = \frac{100 - a}{1 + x}$$

to give a direct efficiency reading.

The quotient $$x = \frac{RM \cdot (Rt - t)}{D} \cdot \mu$$

can also be considered as the quotient between $E_1$ and $E_2$, that is the relation of the heat energy flowing off with the flue gas and the heat energy used for the generation of the steam. As it is possible to set:

$$E_1 = \frac{Va}{100} \cdot E$$

$$E_2 = \frac{\eta}{100} \cdot E$$

and $$E = B \cdot Hu$$

wherein $B$ denotes the total burning fuel in kg. per second and $Hu$ the lower heating value of the combustible in kcal. per kg., one gets the relation:

$$x = \frac{E_1}{E_2} = \frac{Va}{\eta} \cdot \frac{B \cdot Hu}{B \cdot Hu} = \frac{Va}{\eta}$$

From this equation it is apparent that the relation of the two energies $E_1 : E_2$ and in consequence thereof, the measurement of the quotient $x$ as well as the measurement of the rate of efficiency of the boiler $\eta$, is perfectly independent of any changes in or of the absolute size of the lower heating value of the burning combustible, as the total heat $E = (B \cdot Hu)$ disappears in the quotient.

The conditions described above change slightly if an incomplete combustion takes place. In this case a fourth part of energy $E_4$ is supplied by the total energy $E$. This part contains the energy that corresponds to the heating capacity of the unburnt gases, mainly CO and $H_2$. Designating this loss in percent of the total energy E with $V_{co}$, the sum of the two energies $\eta$ and $V_a$ will amount only to the value $100-(V_{co}+a)$, instead of the previous value $(100-a)$, upon which the scale of the quotient meter is based. The efficiency meter indicates therefore a little too much, as the function $$\eta = \frac{1}{1+x}$$

has to be multiplied now with the smaller factor: $[100-(V_{co}+a)]$ instead of $(100-a)$. If $\eta$ denotes the indicated value of the boiler efficiency by the quotient meter and $\eta_0$ the true rate of efficiency at incomplete combustion, the following relation exists:

$$\frac{\eta_0}{\eta} = \frac{100-(V_{co}+a)}{100-a}$$

or $$\eta_0 = \eta - \frac{V_{co}}{100-a} \cdot \eta$$

Therefore the true value of the rate of efficiency of the boiler may be indicated as the difference of the reading of the above mentioned quotient meter and the reading of a $(CO+H_2)$ gas analyser, as the value of the second member of the equation above can be represented directly in the scale of the $(CO+H_2)$ meter. For this purpose it is possible to set with close approximation:

$$V_{co} = p.n.b.$$

Wherein $b$ signifies a constant, $p$ the percentage of unburnt gases $(CO+H_2)$ of the flue gas at the end of the boiler and $n$ the factor for the excess air, giving the relation of the actual air used for the combustion to the air required for theoretical combustion. The constant $b$ depends somewhat on the lower heating value of the fuel, it amounts to about 3.30 for solid combustibles with a lower heating value between 3500 and 8000 kcal. per kg. and is about 3.70 to 3.90 for soft brown coal with much moisture with a heating value between 1500 and 3500 kcal. per kg. In view of the small absolute size of the corrections that have to be taken care of by the $(CO+H_2)$-meter, the variable factors $n$ for the excess air and for the boiler efficiency $\eta$ can be replaced here by constant means values $n_m$ and $\eta_m$, as the amount of excess air and the boiler efficiency are known approximately for a given type of boiler. Inserting these values, one gets the amount of the plus reading or the required correction for the efficiency meter:

$$fp = \frac{n_m.b.\eta_m}{100-a} \cdot p$$

With this constant factor $f$ and the percentage of unburnt gases $p$, one can give the scale of the $(CO+H_2)$-meter directly a division for the reading of these corrections, as the percent-scale has only to be enlarged by $f$.

By this combination of a quotient meter indicating the rate of efficiency of the boiler for perfect combustion and a gas analyser for unburnt gases, indicating directly the necessary corrections for the plus reading of the first meter, it is now possible to determine accurately the most favorable state of combustion, which lies generally in the zone of incomplete combustion. The indication is correct regardless of the condition of the boiler itself, no matter what kind of combustible is used, or how the lower heating value changes. The boiler operator has now an absolutely reliable instrument indicating how to run the boiler and he sees at once the effect of any mistake or change he has made in the operation. He has only to adjust the supply of fuel to the demand of steam and to change the air until best efficiency is obtained. A bad condition of the boiler will be shown at once in a low rate of efficiency.

As the $(CO+H_2)$-meter serves only to indicate the plus error of the rate of efficiency meter, a lag in indication is not so important here and is permissible.

In a similar way the flue gas loss can be indicated continuously in percent by a quotient meter. From the two equations for the energy at complete combustion, one gets:

$$\frac{E_1}{E_1+E_2} = \frac{V_a}{100-a}$$

Inserting herein the values for $E_1$ and $E_2$ in kcal., one gets:

$$V_a = \frac{100-a}{1+\frac{E_2}{E_1}}$$

$$V_a = \frac{100-a}{1+\frac{D}{RM.(Rt-t)} \cdot \frac{(i-ts)}{cpm}}$$

The quotient for the indication of $V_a$ is now:

$$y = \frac{D}{RM.(Rt-t)} \cdot \frac{1}{\mu} = \frac{1}{x}$$

and the quotient meter contains in its scale the straight line function $$V_a = \frac{100-a}{1+y}$$

This quotient meter indicates thus the flue gas loss $V_a$ in percent directly. At an incomplete combustion the quotient meter reads too high but can be corrected as before by a $(CO+H_2)$-meter, by using the average flue gas loss $V_{am}$ in the scale and by enlarging the percent-scale for $(CO+H_2)$ by the factor $$\frac{n_m.b.V_{am}}{100-a}$$

Before giving any details of the quotient meter for the rate of efficiency, it is necessary to describe more exactly the introduction of the temperature factors, represented by the values $(Rt-t)$ and $(i-ts)$. As generally the differential pressure method is taken for the flue gas measurement in connection with a parabolic nozzle and a ring balance or a flow meter of bell type with parabolic displacer or curved disc, the indicated flow will change with the flue gas temperature proportional to the expression:

$$\sqrt{\frac{Rt_0+273}{Rt_0 \pm \Delta t+273}}$$

which can be expanded into $$\left[1 \mp \frac{\Delta t}{2(Rt_0+273)}\right]$$

Wherein $Rt_0$ signifies the average flue gas temperature of the boiler introduced as a constant into the measurement, $\Delta t$ the deviation of the real flue gas temperature $Rt$ from $Rt_0$ in degrees Centigrade, using here the minus sign for a plus value at $\Delta t$, when $Rt$ is larger than $Rt_0$ and vice versa.

Any actual change $\Delta t$ of the flue gas temperature $Rt_0$ will cause the following change in the product $RM.(Rt-t)$:

$$RM.(Rt-t) = RM.(Rt_0 - t \pm t) \cdot \left[1 \mp \frac{\Delta t}{2.(Rt_0 + 273)}\right]$$

$$= RM.(Rt_0 - t) \cdot \left(1 \pm \frac{\Delta t}{(Rt_0 - t)}\right) \cdot \left[1 \mp \frac{\Delta t}{2.(Rt_0 + 273)}\right]$$

$$= RM.(Rt_0 - t).d$$

As $(Rt_0 - t)$ is constant, the factor $d$ is the total temperature factor with which the flue gas flow $RM$ has to be multiplied for the measurement of the product. As $$d = \left(1 \pm \frac{\Delta t}{(Rt_0 - t)}\right) \cdot \left[1 \mp \frac{\Delta t}{2.(Rt_0 + 273)}\right]$$

and as the second members of each of the two factors are small compared to the value 1, one can set for the temperature factor $d$ very closely:

$$d = 1 \pm \frac{\Delta t}{Rt_0 - t} \mp \frac{\Delta t}{2.(Rt_0 + 273)}$$

$$= 1 \pm \frac{1 - \frac{(Rt_0 - t)}{2(Rt_0 + 273)}}{(Rt_0 - t)} \cdot \Delta t$$

$$= 1 \pm m.\Delta t$$

The factor $m$ has a constant value for a given boiler and is expressed by:

$$m = \frac{1 - \frac{(Rt_0 - t)}{2.(Rt_0 + 273)}}{(Rt_0 - t)}$$

This temperature factor $d = (1 \pm m \cdot \Delta t)$ gives a simple correcting element for the total influence of temperature changes of the product $RM \cdot (Rt - t)$. With $(Rt_0 - t)$ as a constant, it is therefore:

$$RM.(Rt-t) = RM.(1 \pm m.\Delta t).(Rt_0 - t)$$

The temperature factor $(i - t_s)$ of the steam flow contains the heat capacity $i$. As mentioned above, a constant mean value $i_0$ can be used. The changes of $i$ are too small for any changes in pressure, and the necessary changes of $i$ for any changes in temperature of superheated steam can easily be compensated by the plus or minus reading of a steam meter of differential pressure type, having purposely no temperature correcting element for the flow indication. The constant value $i_0$ corresponds then to that condition of steam temperature for which the steam meter reads correctly. Consequently only the changes of the feed water temperature $t_s$ have to be considered in the measurement.

The changes in feed water temperatures are generally small compared to the large value of $i_0$, so that it may frequently be possible to neglect these changes.

Introducing here, however, in a similar manner as before, a constant average feed water temperature $t_{s0}$ and the constant average heat capacity $i_0$ for 1 kg. of the steam and designating with $\tau$ the deviation of the real feed water temperature $t_s$ from the mean value $t_{s0}$, the constant value $(i_0 - t_{s0})$ will change by $\tau$ for a given change of $\tau$. It is then:

$$(i_0 - t_s) = (i_0 - t_{s0}) \mp \tau$$
$$= \left(1 \mp \frac{\tau}{(i_0 - t_{s0})}\right) \cdot (i_0 - t_{s0})$$
$$= (1 \mp s.\tau).(i_0 - t_{s0})$$

Here again the factor $s$ is constant for a given boiler with:

$$s = \frac{1}{(i_0 - t_{s0})}$$

and corresponds to the inverse value of the mean generating heat of 1 kg. of steam.

With these temperature factors the expressions for the quotient $x$ and $y$ for the indications of the rate of efficiency and flue gas loss can be written:

$$x = \frac{RM.(Rt_0 - t)}{D} \cdot \frac{(1 \pm m.\Delta t)}{(1 \mp s.\tau)} \cdot \frac{cpm}{(i_0 - t_{s0})}$$

$$= \frac{RM}{D} \cdot \frac{(1 \pm m.\Delta t)}{(1 \mp s.\tau)} \cdot \frac{(Rt_0 - t).cpm}{(i_0 - t_{s0})}$$

and correspondingly $$y = \frac{D}{RM} \cdot \frac{(1 \mp s.\tau)}{(1 \pm m.\Delta t)} \cdot \frac{(i_0 - t_{s0})}{(Rt_0 - t).cpm}$$

In both expressions the last factor is constant. Designating this last constant factor of the expression $x$ for a given boiler with $e$, one gets:

$$e = \frac{(Rt_0 - t).cpm}{(i_0 - t_{s0})}$$

and the expressions for the quotients are at last simplified to the following values, upon which the actual measurement will be based:

$$x = \frac{RM}{D} \cdot \frac{(1 \pm m.\Delta t)}{(1 \mp s.\tau)} \cdot e$$

$$y = \frac{D}{RM} \cdot \frac{(1 \mp s.\tau)}{(1 \pm m.\Delta t)} \cdot \frac{1}{e}$$

The present method, therefore, consists in the continual indication of these quotients by quotient meters of which the scales contain in their divisions the special function between the rate of efficiency or flue gas loss of the boiler and the quotient itself.

Suitable apparatus for carrying out the method of boiler indication as so far described is illustrated in the accompanying drawing, in which:

Figure 1 is a diagrammatic view of a boiler with an indicating system embodying the invention applied thereto;

Figure 2 illustrates a modified arrangement for indicating the efficiency;

Figure 3 illustrates a gas analyzer scale for use with the present invention; and Figure 4 illustrates a composite indicating instrument.

Figure 1 illustrates a boiler 10 supplied with fuel by a stoker 12, although it is to be understood that any suitable supply means for supplying gas, oil or the like to the furnace might be employed. A plurality of water tubes 14 are mounted in the boiler and are connected to a suitable header or drum 16 from which a steam pipe 18 leads to any desired steam consuming apparatus. Baffles 20 divide the boiler into several passes terminating in a flue 22 connected to a suitable stack or the like. While one particular form of boiler has been illustrated it will be understood that this is not material to the invention but that the invention might be utilized with any desired type of boiler.

In order to measure the steam flow from the boiler, an orifice 24 is placed in the pipe 18 and has its opposite sides connected to a steam flow meter 26 which may be of any desired type. The meter 26 is connected to a rod 28 and serves to move it vertically proportionally to variations in steam flow. As pointed out above the meter 26 is uncorrected for temperature so that it automatically compensates for superheat. Thus the rod 28 is moved proportionally to variations in the quantity of heat flowing from the boiler in the steam.

According to the present invention the gas flow is measured by a venturi located outside of the furnace so as to be unaffected by changed boiler conditions and to obtain an accurate measurement of all combustion products and air or gas leaving the boiler. As shown a venturi 30 is mounted in the flue 22 and has connections from its inlet side and its throat to a flow meter 32. A rod 34 has one end connected to the meter 32 to be moved thereby proportionally to variations in the flow through flue 22.

The gas temperature is measured by a thermometer 36 extending into the venturi 30 so that gas flow and temperature are measured at the same point. A temperature responsive instrument 38 is connected to the thermometer 36 and to a rod 40 which is moved thereby proportionally to temperature changes.

The steam flow, gas flow and gas temperature are preferably separately indicated and since the indicating mechanisms may be identical only one of them will be described in detail. As shown, the rod 28 is connected to a pivoted wiper arm 42 which is connected to one side of a battery or the like 44, the other side of which is connected to one end of each of two crossed coils 46. The other ends of the crossed coils 46 are connected respectively to the opposite ends of a resistance 48 over which the wiper 42 moves. An arm 50 is operated by the coils 46 and moves a pointer 52 over a scale 54 which is suitably calibrated in terms of steam flow or of the quantity of heat flowing out in the steam.

As the arm 42 is moved by the meter 26 the effective resistance in circuit with each of the coils 46 is varied to cause a corresponding variation in the relative effective strength of the coils so that the arm 50 will be moved. Thus the indication can readily be carried to any desired point remote from the meter 26.

The rods 34 and 40 operate similar wiper arms 56 and 58 over similar resistances 60 and 62 to indicate gas flow and gas temperature respectively on scales 64 and 66.

The indicating mechanism also preferably includes means for automatically solving the equations set out above to give a direct indication of the instantaneous boiler efficiency. As shown, each of the rods 28, 34 and 40 operates a second wiper arm 68, 70 and 72 moving respectively over resistances 74, 76 and 78. The resistance 74 has its opposite ends connected to one of a pair of crossed coils 80 and to the opposite ends of a resistance 82 whose center is connected through a rheostat 84 and an ammeter 85 to one side of a battery or the like 86. The rheostat 84 provides an adjustment to set for the fixed losses through radiation and the like corresponding to the energy $E_3$ in the above equations. The wiper arm 68 is connected through a rheostat 88 to the opposite side of the battery 86, the rheostat 88 serving to set the feed water temperature and specific heat of the steam corresponding to the quantity $(i-ts)$ in the above equations. Thus the one coil 80 will be energized proportionally to the quantity $D$ $(i-ts)$ or to the quantity of heat utilized in the generation of steam.

The resistance 76 has its opposite ends connected to the ends of the other crossed coil 80 and to the ends of a resistance 90 whose center is connected through the rheostat 84 to one side of the battery 86. The wiper arm 70 is connected to the resistance 78 and the wiper arm 72 is connected to the other side of the battery. Thus the other coil 80 will be energized proportionally to the product of gas flow and gas temperature $[RM(Rt-t)]$. The whole circuit forms a bridge and together with the crossed coils divides the heat energy of the gas by the heat energy of the steam to solve the quotient in the equations noted above so that by properly calibrating the device the instantaneous efficiency can be indicated directly. An arm 92 is mounted so as to move in response to the joint effects of the coils 80 to move a pointer 94 over a scale 96 which is suitably calibrated in terms of efficiency.

If desired suitable adjustments of the rheostat 84 may be made to correct for unburned gas $(CO+H_2)$ as indicated by a gas analyzer. However, the error in reading of the efficiency meter may itself be corrected if desired to obtain a correct value of the efficiency. For this purpose a gas analyzer 97 for measuring unburned gas may be provided with a scale as indicated in Figure 3 in which the upper part of the scale 98 reads directly in percent of unburned gas passing out of the furnace and the lower part of the scale 100 reads directly in efficiency correction. A pointer 102 operated by the gas analyser 97 moves over both parts of the scale and to correct the efficiency meter reading on scale 96 it is necessary only to deduct the indicated correction on the scale 100.

Figure 2 indicates a mechanical method for indicating the efficiency in which a steam flow meter 104 connected to opposite sides of an orifice such as 24 operates a cam 106 which in turn moves a lever 108 and a scale 110. A gas flow meter 112 connected to a venturi or the like such as 30 is corrected for gas temperature and moves a cam 114 proportionately to the product of gas flow and gas temperature. A lever 116 is operated by the cam 114 and moves a pointer 118 over the scale 110.

The cams 106 and 114 give logarithmic motions to the scale 110 and the pointer 118 and the scale is displaced to the right a distance equal to log $e$ as determined from the equations set out above. Therefore the instantaneous efficiency is indicated directly on scale 110 by the pointer 118.

Figure 4 shows one form of rate of efficiency meter, developed as a simple double indicating instrument with two electric measuring systems for long distance transmission. One system includes a steam flow device 120 responsive to steam flow and connected to the pointer A to show the steam flow on the upper D-scale, while the other includes a differential indicator 122 connected to a gas flow meter 124 and a gas temperature responsive unit 126 and operating a pointer B carrying a triangular scale C with a convergent scale F for the rate of efficiency. The pointer B indicates the quantity of heat in the flue gas or the value of the product $RM.(Rt-t)$ on the second instrument scale above. The $RM.(Rt-t)$ scale has been calculated in this example for a boiler with an average rate of efficiency of 70% and the vertical line on the convergent F-scale is marked 70%. The maximum value of the $RM.(Rt-t)$ scale of 3530 has been calculated here for an average flue gas loss of 25%, a value of the constant losses "$a$" of 5%, a mean specific heat $cpm$ of 0.333 and a mean generating heat $(i_0-ts_0)$ of 660 kcal. per kg. of steam. An indicating line S starts at the point G in line with the top of the triangular scale on the zero line of the scale and runs to a point H on the base line of the triangular scale and a distance M away from the maximum value of the instrument scale. This value M corresponds to the distance of the left starting point of the triangular scale to the vertical line 70%. The triangular scale shows the horizontal divisions of the D-scale, reduced to the height of the triangle. The left side of the triangular scale intersects the indicating line S at a value of D of nearly 3.0 checking the position of the $RM.(Rt-t)$ pointer B on the above large instrument scale for D. The D-pointer A shows on the line of 3.0 on the triangular rate of efficiency scale an efficiency of 72.4% of the boiler, giving thereby the actual boiler efficiency.

This application is a continuation in part of my application Serial No. 174,173, filed November 12, 1937.

While several embodiments of the invention have been described it will be apparent that many changes might be made therein or that the method might be carried out in many different ways. It is accordingly not intended to limit the invention to the exact forms described nor otherwise than by the terms of the appended claims.

What is claimed is:

1. Apparatus for determining the efficiency of a boiler comprising means for measuring the flow of steam from the boiler, means for measuring the flow of gas from the boiler, means for measuring the gas temperature, means for multiplying the gas flow by the gas temperature to determine the quantity of heat in the gas and means for dividing said quantity by the steam flow.

2. Apparatus for determining the efficiency of a boiler comprising means for measuring the flow of steam from the boiler, means for measuring the flow of gas from the boiler, means for measuring the gas temperature, means for multiplying the gas flow by the gas temperature to determine the quantity of heat in the gas, means to adjust the steam flow measurement to correct for feedwater temperature to determine the quantity of heat absorbed in the steam, and means for dividing one of said quantities by the other to obtain a quotient determining the efficiency.

3. Apparatus for determining the efficiency of a boiler comprising means for measuring the flow of steam from the boiler, means for measuring the flow of gas from the boiler, means for measuring the gas temperature, means for multiplying the gas flow by the gas temperature to determine the quantity of heat in the gas, means to adjust the steam flow measurement to correct for feedwater temperature to determine the quantity of heat absorbed in the steam, means for dividing one of said quantities by the other to obtain a quotient determining the efficiency and means to correct said quotient for constant boiler losses.

4. Apparatus for determining the efficiency of a boiler comprising means for measuring the flow of steam from the boiler, means for measuring the flow of gas from the boiler, means for measuring the gas temperature, means for multiplying the gas flow by the gas temperature to determine the quantity of heat in the gas, means to adjust the steam flow measurement to correct for feedwater temperature to determine the quantity of heat absorbed in the steam, and means for dividing one of said quantities by the other to obtain a quotient determining the efficiency, and means to indicate the unburned gas flowing from the boiler whereby said quotient may be corrected for unburned gas.

5. Apparatus for determining the efficiency of a boiler comprising means forming a restriction in a steam pipe leading from the boiler, a flowmeter connected to said restriction to measure the steam flow, means forming a restriction in a flue gas conduit leading from the boiler, a flowmeter connected to said restriction to measure the gas flow, a thermometer in the conduit adjacent said last named restriction to measure the gas temperature, and means operated by said flowmeters and said thermometer to combine the measurements in a ratio determining the boiler efficiency.

6. Apparatus for determining the efficiency of a boiler comprising means forming a restriction in a steam pipe leading from the boiler, a flowmeter connected to said restriction to measure the steam flow, means forming a restriction in a flue gas conduit leading from the boiler, a flowmeter connected to said restriction to measure the gas flow, a thermometer in the conduit adjacent said last named restriction to measure the gas temperature, means operated by said flowmeters and said thermometer to combine the measurements in a ratio determining the boiler efficiency and means to adjust said ratio to correct for feedwater temperature and for constant boiler losses.

7. Apparatus for determining the efficiency of a boiler comprising means forming a restriction in a steam pipe leading from the boiler, a flowmeter connected to said restriction to measure the steam flow, means forming a restriction in a flue gas conduit leading from the boiler, a flowmeter connected to said restriction to measure the gas flow, a thermometer in said last named restriction to measure the gas temperature, means operated by said flowmeters and said thermometer to combine the measurements in a ratio determining the boiler efficiency, and means to indicate the unburned gas flowing from the boiler whereby said ratio may be corrected for incomplete combustion.

8. Apparatus for determining the efficiency of a boiler comprising means forming a restriction in a steam pipe leading from the boiler, a flowmeter connected to said restriction to measure the steam flow, means forming a restriction in a flue gas conduit leading from the boiler, a flowmeter connected to said restriction to measure the gas flow, a thermometer in said last named restriction to measure the gas temperature, an electric circuit, variable circuit controlling devices in said circuit connected to said flowmeters and said thermometer, and quotient responsive indicating means connected to and controlled by said circuit to indicate the boiler efficiency.

9. Apparatus for determining the efficiency of a boiler comprising means forming a restriction in a steam pipe leading from the boiler, a flowmeter connected to said restriction to measure the steam flow, means forming a restriction in a flue gas conduit leading from the boiler, a flowmeter connected to said restriction to measure the gas flow, a thermometer in said last named restriction to measure the gas temperature, an electric circuit, variable circuit controlling devices in said circuit connected to said flowmeters and said thermometer, a controlling device in said circuit adjustable to correct for constant losses and for unburned gas flowing from the boiler, and quotient responsive indicating means connected to and controlled by said circuit to indicate the boiler efficiency.

WILHELM E. GERMER.